3,549,626
PROCESS FOR PREPARING 1-LOWERALKYL-
5-NITROIMIDAZOLES
Philip Miller, Somerset, and Carroll Sherman Montgomery, Piscataway, N.J., assignors to American Cyanamid Company, Stamford, Conn., a corporation of Maine
No Drawing. Filed May 28, 1969, Ser. No. 828,759
Int. Cl. C07d 49/36
U.S. Cl. 260—240   5 Claims

ABSTRACT OF THE DISCLOSURE

An improved method of preparing 1-lower alkyl-2-substituted-5-nitroimidazoles by a two-step process from 1-lower alkyl-2-methyl-5-nitroimidazoles. The compounds prepared by the process are useful as intermediates in the preparation of substituted imidazoles having anti-trichomonal, anti-histomonal, anti-bacterial and anti-parasitic activity.

Compounds which are intermediates in the present process are described and claimed in our copending application Ser. No. 828,787, filed May 28, 1969.

SUMMARY OF THE INVENTION

This invention relates to an improved process for the manufacture of 1-lower alkyl-2-(2-substituted vinyl)-5-nitroimidazoles by means of a two-step synthesis from 1-lower alkyl-2-methyl-5-nitroimidazoles.

According to the process of this invention, a 1-lower alkyl-2-methyl-5-nitroimidazole (I) is condensed with an aromatic aldehyde in the presence of a strong base and a solvent to afford the corresponding 2-(2-aryl-2-hydroxyethyl)imidazole (II). Intermediate (II) is then dehydrated by the use of a strong mineral acid or toluene sulfonic acid, to the desired compound (III). The reaction sequence is as follows:

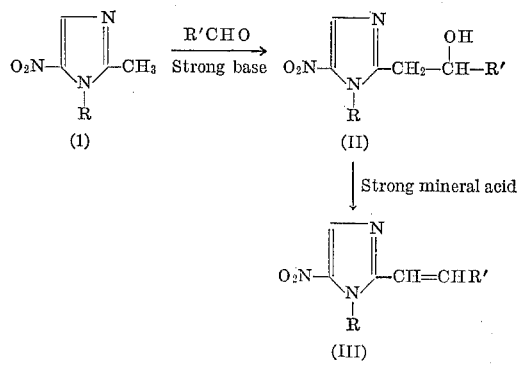

wherein R is lower alkyl and R' is phenyl, halophenyl, lower alkylphenyl and lower alkoxyphenyl.

The 1-lower alkyl-2-(2-substituted vinyl)-5-nitroimidazoles (III) are useful as intermediates in the synthesis of antibacterial agents such as described in Science 162 page 1146 (1968). The conversion of the present compounds to the antibacterial compounds described in Science, is shown hereinafter. Also, U.S. Pat. 3,378,552 disclosed that 1-lower alkyl-5-nitroimidazole-2-carboxamides, obtained via the 1-lower alkyl-2-(2-substituted vinyl)-5-nitroimidazoles, have activity as anti-trichomonal and anti-histomonal agents.

The improved process of this invention is based on the discovery that the 1-lower alkyl-2-(2-substituted vinyl)-5-nitroimidazoles are obtained via a two-step synthesis from 1-lower alkyl-2-methyl-5-nitroimidazoles wherein the latter is condensed with an aromatic aldehyde at a low temperature in the presence of a low concentration of strong base to produce an intermediate, 1-lower alkyl-2-(2-aryl-2-hydroxyethyl)-5-nitroimidazole, which is then dehydrated by the use of a strong mineral acid to give the desired product.

The present process differs from the process of the cited U.S. Pat. 3,378,552 in that (a) the desired substituted vinyl imidazoles are obtained via a novel aryl hydroxyethyl derivative (II); (b) the condensation is conducted at a low temperature in the presence of (c) a low concentration of a strong base.

The present process has the advantage of yielding the desired product (III) in higher overall yield and purity, e.g., the product has a better color (bright yellow rather than greenish-brown), higher melting point (199°-201° C. vs. 194°-196° C.) and a yield of 79%-86% vs. about 70%.

In the condensation reaction, a 2-methyl-5-nitroimidazole substituted in the 1-position with a lower alkyl group (1–6 carbon atoms), is reacted with an aromatic aldehyde in the presence of a strong base at a temperature in the range of about 15° C. to about 40° C. The condensation is conducted in a solvent.

Among the strong bases found useful in catalyzing the condensation are strong metal hydroxides, such as sodium or potassium hydroxide; alkali or alkaline earth metal alkoxides, such as sodium ethoxide, potassium t-butoxide, sodium isopropoxide, potassium methoxide, and the like; metal amides, such as sodamide or potassium amide. The strong metal hydroxides are the preferred catalyst. The base catalyst is used in the condensation in an amount of from about 0.02 to 1.0 mole per mole of 1-lower alkyl-2-methyl-5-nitroimidazole, preferably from about 0.05 to 0.2 mole (same basis).

In carrying out the reaction, benzaldehyde is the preferred aromatic aldehyde. However, other aromatic or substituted aromatic aldehydes or heterocyclic aldehydes are equally suitable. Included as useful aldehydes, for example, are 4-chlorobenzaldehyde, 2-methoxybenzaldehyde, 4-methylbenzaldehyde, 2-chlorobenzaldehyde, 4-fluorobenzaldehyde; naphthaldehyde, furfural, and the like. The aldehyde is preferably used in excess over that which is stoichiometrically required; slight excesses, i.e., from about 1 to 2 moles of aldehyde per mole of 1-lower alkyl-2-methyl-5-nitroimidazole, are particularly to be preferred. It should be recognized, however, that larger excesses, e.g., from 1 to 8 moles of aldehyde, can be used. There is no need for larger excesses and such use would normally be economically disadvantageous.

The condensation is conducted in the presence of a solvent. The preferred solvents are aliphatic alcohols, such as methanol, ethanol, isopropanol, butanol, and the like. Aprotic solvents, such as dimethylformamide, dimethylacetamide, dimethylsulfoxide, or aromatic hydrocarbons, such as benzene, toluene, xylene, and the like, are also useful.

The condensation reaction is normally conducted for a period of from about 2 to about 5 hours, although the reaction time is not critical provided the concentration of base and temperature used are within the ranges described.

Dehydration of the 1-lower alkyl-2-(2-aryl-2-hydroxyethyl)-5-nitroimidazole thus obtained is conveniently carried out in an organic carboxylic acid, such as acetic acid or propionic acid, preferably glacial acetic acid. The dehydration is affected by the use of a 15 to 20% by weight solution of (II) of a strong mineral acid, such as sulfuric acid, hydrochloric acid, or an aromatic sulfonic acid, such as p-toluenesulfonic acid in the organic acid. The preferred acid is 98% sulfuric acid. The dehydration may also be conducted by the use of a strong mineral acid in the absence of a solvent.

In carrying out the dehydration a temperature within the range of about 80° to 120° C., preferably 100° to 110° C. for about 2 to 3 hours, is desirable.

Following completion of the dehydration reaction, the mixture is drowned in several volumes of ice water, filtered, washed with water until acid free, then with alcohol and dried. Yields of 90 to 97% are realized in the dehydration. No impurities are detectable by thin-layer chromatography.

The present invention is directed to the manufacture of 1-lower alkyl - 2 - (2-substituted vinyl)-5-nitroimidazoles (III). The novel intermediate compounds (II) are described and claimed in the copending application referred to above. The compounds prepared in the present application are useful intermediates in the synthesis of highly active antibacterial and antiprotozoal agents. The conversion of the present compounds to the antibacterial and antiprotozoan compounds may be specifically illustrated as follows:

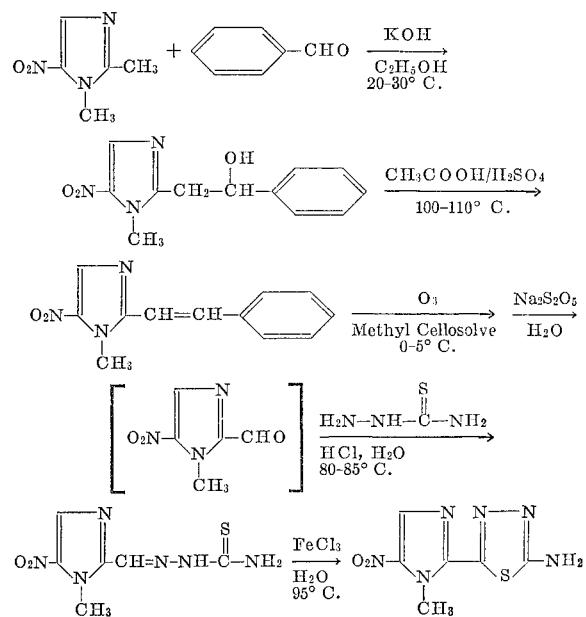

The above reactions are described in detail in the examples hereinafter.

SPECIFIC DISCLOSURE

The following examples describe in detail the preparation of the present compounds by the process of the present invention, and the conversion of these compounds to the highly active 2-(2-amino-5-thiadiazoyl)-1-methyl-5-nitroimidazole.

EXAMPLE 1

Preparation of 1 - methyl - 2 - (2-phenyl-2-hydroxyethyl)-5-nitroimidazole

To a 750 gal. kettle is charged:

(1) 1,095 lb. ethanol
(2) 30 lb. potassium hydroxide (flake, 90%)
(3) 400 lb. 1,2-dimethyl-5-nitroimidazole
(4) 329 lb. benzaldehyde.

The resulting slurry is stirred at 25–35° C. for 3 hours, filtered on a centrifuge and the cake washed with 450 lb. ethanol. After drying at 55°–60° C., the product weighed 623 lb. (89% of theory), melting point 175°–176° C.

EXAMPLE 2

Preparation of 1-methyl-5-nitro-2-styrylimidazole

To a 750 gal. kettle is charged:

(1) 1039 lb. glacial acetic acid
(2) 451 lb. 98% sulfuric acid
(3) 618 lb. 1 - methyl - 2 - (2-phenyl-2-hydroxyethyl)-5-nitroimidazole.

(Kettle is cooled during charging to control temperature below 40° C.) The resulting slurry is then heated to 105° C. and stirred at 105°–110° C. for 3 hours. The batch is then cooled to 50–60° C. and drowned in a slurry of 1775 lb. flake ice and 2000 lb. treated water, keeping the temperature below 20°–25° C. during the drowning. The resultant slurry is stirred 1 hour at 20°–25° C., and filtered on a centrifuge. The cake is washed with 600 lb. ethanol and spun dry. After drying at 70°–75° C., the product weighs 535 lb. (93% of theory), melting point 199°–202° C.

EXAMPLE 3

Preparation of 1 - methyl-2-(2-phenyl-2-hydroxyethyl)-5-nitroimidazole

A solution of 1.8 g. (0.032 mole) of potassium hydroxide in 150 ml. of ethanol is stirred at about 25° C. at 42.3 g. (0.30 mole) of 1,2-dimethyl-5-nitroimidazole and 63.6 g. (0.60 mole) of benzaldehyde are added rapidly. The mixture is stirred for about 3 hours, the resulting precipitate filtered, washed with ethanol and dried. There is obtained 65.4 g. of yellow product melting point 172°–176° C.

EXAMPLE 4

Preparation of 1-methyl-5-nitro-2-styrylimidazole

Sulfuric acid, 46 ml., 98%, is added to 106 ml. of glacial acetic acid, maintaining the temperature below 40° C. To the stirred solution is slowly added 63 g. (0.255 mole) 1 - methyl - 2 - (2-phenyl-2-hydroxyethyl)-5-nitroimidazole maintaining the temperature at 35–40° C. The reaction mixture is then heated to 80° C. slowly and then to 105°–110° C. The reaction mixture is stirred at 105°–110° C. for about 3 hours. The yellow solution is slowly cooled to about 40° C. and "seeded" to precepitate the product. After stirring for about 15 minutes at 35°–38° C., the reaction mixture is poured over 177 g. ice in 200 ml. water. The resulting slurry is stirred for 30 minutes, filtered and the product washed with water until the filtrate is neutral. The filter cake is then washed with ethanol and dried. There is obtained 56.5 g. (97%) of yellow product, melting point 199°–202° C.

EXAMPLE 5

Preparation of 1 - methyl - 5-nitro-2-imidazolecarboxaldehyde thiosemicarbazone

A mixture of 22.9 g. (0.1 mole) of 1-methyl-5-nitro-2-styrylimidazole is ozonized for a period of about 70 minutes. The resulting turbid yellow solution is stirred as 9.5 g. (0.05 mole) of sodium metabisulfite in 175 ml. water is added dropwise over a period of about 30 minutes. The temperature increased during the addition to about 40°–45° C. To this solution at about 40° C. is added 23 ml. (9.9 g., 0.27 mole) of hydrochloric acid and 9.6 g. (0.1 mole) of thiosemicarbazide. On heating to 80° C. a yellow precipitate formed which is stirred at 80° C. for about 2 hours. The mixture is then cooled to 20°–25° C., the precipitate filtered, washed with 580 ml. water until the filtrate is neutral, then with 125 ml. ethanol and dried. There is obtained 16.5 g. (72%), melting point 228°–232.5° C.

EXAMPLE 6

Preparation of 2 - (2 - amino - 5-thiadiazolyl)-1-methyl-5-nitroimidazole

The 1-methyl-5-nitro-2-imidazolecarboxaldehyde thiosemicarbazone is added to a solution of 42.7 g. (0.158 mole) of ferric chloride hexahydrate in 207 ml. water and heated at 95° C. for 6 hours. The mixture is cooled to 0–5° C. and the solid material filtered, washed with 180 ml. water and dried. There is obtained 8.1 g. (91%) of product, melting point 263°–265° C. having a purity of 97.9%.

What is claimed is:
1. A method for the preparation of 1-lower alkyl-5-nitroimidazoles of the formula:

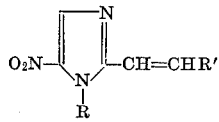

wherein R is lower alkyl and R' is selected from the group consisting of phenyl, halophenyl, lower alkylphenyl and lower alkoxyphenyl, which comprises condensing a 1-lower alkyl-2-methyl-5-nitroimidazole with a stoichiometric excess of an aldehyde of the formula:

wherein R' is as defined above, in the presence of from about 0.02 to 1.0 mole, per mole of nitroimidazole of a strong base in a solvent at a temperature of from about 15° C. to about 40° C. to form a

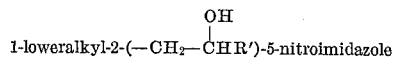

dehydrating said hydroxynitroimidazole at a temperature within the range of about 80° C. to about 120° C., in the presence of strong mineral acid or a p-toluenesulfonic acid-lower alkanoic acid.

2. A method for the preparation of 1-lower alkyl-5-nitroimidazoles in accordance with claim 1, in which the starting material is 1,2-dimethyl-5-nitroimidazole.

3. A method for the preparation of 1-lower alkyl-5-nitroimidazole in accordance with claim 1, in which the aldehyde is benzaldehyde.

4. A method for the preparation of 1-lower alkyl-5-nitroimidazoles in accordance with claim 1, in which the strong mineral acid is concentrated sulfuric acid.

5. In a method for preparing 1-lower alkyl-5-nitroimidazoles in accordance with claim 1, the step which comprises condensing a 1-lower alkyl-2-methyl-5-nitroimidazole with benzaldehyde in the presence of ethanol.

References Cited
UNITED STATES PATENTS
3,274,184  9/1966  Thompson et al. ____ 260—240
3,378,552  4/1968  Henry _____ 260—240

OTHER REFERENCES
Hofmann, Imidazole and Its Derivatives, Part I, pages 132 to 135, Interscience Publishers (N.Y.) (1953).

JOHN D. RANDOLPH, Primary Examiner

U.S. Cl. X.R.
260—306.8, 309, 999